United States Patent [19]

Onoda et al.

[11] 3,920,449

[45] Nov. 18, 1975

[54] PROCESS FOR RECOVERING NOBLE METAL

[75] Inventors: Takeru Onoda, Tokyo; Yoshitoshi Tsunoda, Kurashiki; Takao Nomura, Kurashiki; Takehisa Nonaka, Kurashiki; Tetsuo Masuyama, Machida, all of Japan

[73] Assignee: Mitsubishi Chemical Industries Limited, Tokyo, Japan

[22] Filed: Aug. 14, 1974

[21] Appl. No.: 497,414

[30] Foreign Application Priority Data

Aug. 14, 1973 Japan................................ 48-91054

[52] U.S. Cl..................... 75/97 R; 75/.5 A; 75/121; 252/411 R; 252/412; 252/414; 252/416; 252/420; 260/604 HF; 423/312; 423/317; 423/22

[51] Int. Cl.².......................................... C22B 11/00

[58] Field of Search.......... 75/.5 R, .5 A, 97 R, 121; 252/411 R, 412, 414, 416, 420; 423/22; 260/604 HF

[56] References Cited
UNITED STATES PATENTS

| | | |
|---|---|---|
| 3,271,458 | 9/1966 | Ellis et al...................... 260/604 HF |
| 3,461,157 | 8/1969 | Olivier et al..................... 252/416 X |
| 3,527,809 | 9/1970 | Pruett et al................... 260/604 HF |
| 3,560,539 | 2/1971 | Booth.............................. 252/411 R |
| 3,641,076 | 2/1972 | Booth .............................. 252/415 X |
| 3,725,047 | 4/1973 | Schneider ........................ 75/121 X |
| 3,856,912 | 12/1974 | Vesely .................................. 423/22 |

FOREIGN PATENTS OR APPLICATIONS

| | | |
|---|---|---|
| 1,185,332 | 3/1970 | United Kingdom.................. 75/.5 A |

*Primary Examiner*—Herbert T. Carter
*Attorney, Agent, or Firm*—Sughrue, Rothwell, Mion, Zinn & Macpeak

[57] ABSTRACT

A process for recovering a Group VIII noble metal with a high yield from an organic solvent solution containing a soluble complex of the noble metal and an organophosphorus compound comprising burning the organic solvent solution in a combustion zone, introducing the combustion product immediately into the aqueous absorbing solution to catch in the aqueous solution the particles of the noble metal and phosphorus oxide formed in the combustion, and recovering the noble metal particles from the aqueous solution.

10 Claims, 1 Drawing Figure

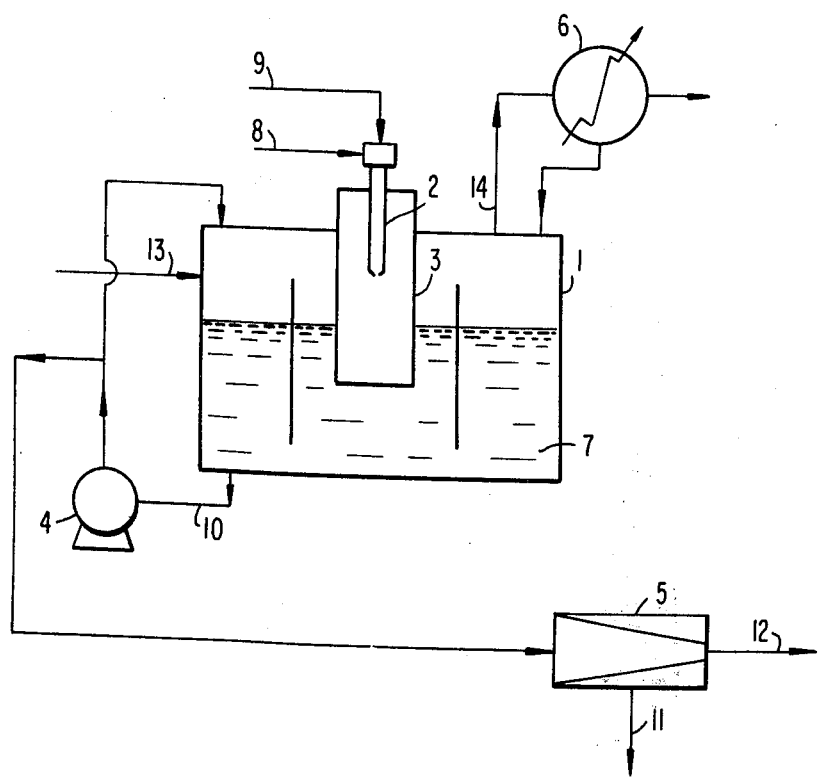

PROCESS FOR RECOVERING NOBLE METAL

BACKGROUND OF THE INVENTION

1. Field of the Invention

The present invention relates to a process for recovering a Group VIII noble metal from a solution containing a compound of the Group VIII noble metal and an organophosphorus compound. More particularly, the invention relates to a process for recovering a Group VIII noble metal from a solution containing a compound of the Group VIII noble metal and an organophosphorus compound and converting, at the same time, the organophosphorus compound in the solution to an innoxious phosphoric acid or phosphate.

2 Description of the Prior Art

Recently, a process has been developed wherein a soluble complex of a Group VIII noble metal and an organophosphorus compound is used as a catalyst in a homogeneous catalytic reaction. The complex is useful for various reactions such as the hydrogenation of olefins, carbonyl compounds, aromatic compounds, etc., and the hydroformylation, e.g., as disclosed in U.S. Pat. No. 3,527,809, and hydrocarboxylation of olefins, e.g., as disclosed in Japanese Pat. Publication No. 25050/1972. Also, since the aforesaid complex is chemically quite stable, the complex remains unchanged in the residue in the case of recovering a reaction product by distilling a reaction mixture formed in the reaction using the complex as the catalyst. Therefore, the residue containing the complex can be recycled in the reaction system for reuse as a catalyst. However, since various high boiling byproducts are formed in the aforesaid reaction and also the catalyst used in the reaction is partially inactivated, a part of the catalyst-containing residue obtained at the recovery of the reaction product by distillation must be removed continuously or intermittently to prevent the accumulation of the high boiling by-products and the inactivated catalyst in the reaction medium.

The catalyst-containing residue contains an expensive Group VIII noble metal and hence it is necessary to recover the noble metal efficiently. In this case, it is also necessary to convert the organophosphorus compound contained in the residue in the free state or in a form combined with the noble metal to an innoxious compound from an environmental protection standpoint and it is also desirable economically to recover the organophosphorus compound as a useful compound.

Hitherto, an adsorption, an extraction using a strong acid (as disclosed in U.S. Pat. No. 3,641,076), or a decomposition by a peroxide has been proposed as a process for recovering the noble metal catalyst. However, in such a conventional process the noble metal catalyst cannot be recovered with a high yield since the organophosphorus compound present in the residue hinders the adsorption of the noble metal catalyst and further the complex is too stable to be decomposed readily. Furthermore, in the conventional process as described above, the phosphorus compound contained in the residue from which the noble metal catalyst has been recovered must be further treated additionally.

SUMMARY OF THE INVENTION

An object of this invention is, therefore, to provide a process for recovering a Group VIII noble metal from a solution containing a compound of the noble metal and an organophosphorus compound unaccompanied by the aforesaid difficulties.

Another object of this invention is to provide a process for recovering a Group VIII noble metal from a catalyst-containing solution in which a soluble complex of the Group VIII noble metal and an organophosphorus compound are contained.

Still another object of this invention is to provide a process for recovering a Group VIII noble metal without causing environmental pollution.

These and other objects of this invention will become apparent from the following description of the invention.

According to the present invention, a process for recovering a Group VIII noble metal from an organic solvent solution of a soluble complex of the Group VIII noble metal and an organophosphorus compound is provided comprising supplying the organic solvent solution and an oxygen-containing gas into a combustion zone, combusting the organic solvent solution, immediately introducing the combustion product into an aqueous absorbing solution to catch the particles of the Group VIII noble metal and phosphorus oxide in the aqueous solution, and recovering the noble metal particles from the aqueous solution.

The solution remaining is an aqueous solution of phosphoric acid and it may be discharged in a drain after neutralization or can, if desired, be used for various purposes.

BRIEF DESCRIPTION OF THE ACCOMPANYING DRAWING

The FIGURE shows a schematic representation of an embodiment of the process of the invention.

DETAILED DESCRIPTION OF THE INVENTION

The process of this invention can be applied to the recovery of a Group VIII noble metal such as ruthenium, rhodium, palladium, iridium and platinum from any organic solvent solution containing a compound of a Group VIII noble metal and an organophosphorus compound. While not desiring to be bound, it is believed that the Group VIII noble metal forms a complex together with an organophosphorus compound or, as the case may be, with an organophosphorus compound and other ligands such as carbonyl, nitrosyl, halogen, olefin, hydrogen and cyano groups. The process of this invention can be particularly usefully applied for recovering the Group VIII noble metal from a waste catalyst solution which is expelled from a process comprising hydroformylation or carboxylation of olefins and contains the Group VIII noble metal compound and an organophosphorus compound. In this case, the waste catalyst solution usually contains reaction products and reaction solvent and thus it is advantageous to concentrate the waste solution containing the complex of the Group VIII noble metal by distilling off the reaction products and reaction solvent and then recovering the noble metal from the concentrate by the process of this invention.

The complex of the Group VIII noble metal containing an organophosphorus compound as a ligand can be easily prepared by a known complex-forming process from a compound of the Group VIII noble metal, such as hydroxide, a halide, a carboxylate, a nitrate, a sulfate, etc., of the noble metal, and an organophosphorus compound, such as a tertiary phosphine or phosphite. As the case may be, also, the complex catalyst can be formed during the reaction by supplying a compound of the Group VIII noble metal and an organophosphorus compound to the reactor.

Specific examples of the Group VIII noble metal compounds which can be used in the preparation of the noble metal/organophosphorus complex are ruthenium compounds such as ruthenium trichloride, tetraamino ruthenium hydroxychloride, etc.; rhodium compounds such as chloropentaaminorhodium (III) chloride, rhodium nitrate, rhodium trichloride, rhodium di-carbonylchloride, rhodium acetate, rhodium sulfate, etc.; palladium compounds such as palladium hydroxide, palladous chloride, palladous cyanide, palladous iodide, palladous nitrate, palladium cyanide, palladium acetate, palladium sulfate, etc.; iridium compounds such as iridium tribromide, iridium tetrabromide, iridium trifluoride, iridium trichloride, iridium carbonyl, etc.; and platinum compounds such as platinic acid, platinous iodide, sodium hexachloroplatinate, potassium trichloroethyleneplatinate, etc.

Also, examples of the organophosphorus compound which can be used in the preparation of the noble metal/organophosphorus complex are phosphines such as trimethylphosphine, chlorodiethylphosphine, tris-(aminoamyl)phosphine, tricyclohexylphosphine, triphenylphosphine, tris(N,N-dimethylanilino)phosphine, tris(o-tolyl)phosphine, phenyldiisopropylphosphine, pheneyldiamylphosphine, ethyldiphenylphosphine, chlorodihexylphosphine, tris(N,N-diethylaminomethyl)phosphine, ethylene-bis(diphenylphosphine), trianilinophosphine, diphenyl(N,N-dimethylanilinophosphine), triphenylanilinoethylenediphosphine, tris(3,5-diaminophenyl)phosphine, aminoethyltriisopropylhexamethylenediphosphine, etc; phosphites such as trimethyl phosphite, triphenyl phosphite, chlorodiphenyl phosphite, tricyclohexyl phosphite, tetraphenylethylene diphosphite, etc.; and penta-valent organophosphorus compounds such as triphenylphosphine oxide, etc.

In this invention, the Group VIII noble metal can be recovered from the solution containing the soluble complex of the Group VIII noble metal which contains the above described Group VIII noble metal compound and the organophosphorus compound and, if desired, can further contain free organophosphorus compound at various concentrations. However, generally the concentration of the noble metal in the organic solvent is preferably adjusted to about 0.05 to 2% by weight calculated as the metal, prior to supplying the above described solution into the combustion device. The concentration of the organophosphorus in the organic solvent is generally adjusted to about 0.1 to 5% by weight, preferably 0.1 to 2% by weight, calculated as phosphorus.

Suitable organic solvents include aromatic hydrocarbons containing six to eight carbon atoms such as benzene, toluene and xylene, paraffinic hydrocarbons containing eight to 12 carbon atoms such as octane, decane and dodecane, aliphatic alcohols containing two to eight carbon atoms such as butanol, pentanol, octanol and ethylene glycol, aliphatic aldehydes containing four to eight carbon atoms such as butanal, aliphatic and alicyclic esters containing four to eight carbon atoms such as butyl acetate and γ-butyrolactone, and high boiling by-products resulting from the hydroformylation or hydrocarboxylation of olefins wherein a soluble complex of a Group VIII noble metal and an organophosphorus compound is used as a catalyst.

Suitable methods which can be used for combustion of the above described solution include burning the solution in a conventional furnace and introducing the combustion gas formed into an absorbing solution by aspirating the combustion gas using a blower. Alternatively, a submerged combustion method can be employed. The submerged combustion method is particularly preferable. That is, in the submerged combustion method, the solution as described above is supplied to a burner and burned with oxygen-containing gas such as air, and the resulting combustion product is immediately introduced into the absorbing solution.

An oxygen-containing gas for combustion is supplied in an excess amount, such as generally about 110 to 150 mole %, preferably 120 to 130 mole %, as oxygen of the theoretical amount for complete combustion. Air is generally used as the oxygen containing gas. The combustion temperature is generally adjusted to about 1,000° to 1,500°C and can also be adjusted by controlling the amount of the oxygen-containing gas supplied, whereby complete combustion can be achieved. Moreover, the volume of the combustion chamber is determined depending upon the amount of liquid to be treated so as to adjust the residence time of the combustion gas formed in the combustion chamber to generally about 0.1 to 5.0, preferably 0.5 to 1.0, seconds.

An arrangement in which the combustion chamber is provided separately from an absorbing drum containing the absorbing solution therein and the combustion gas is introduced into the absorbing drum through a flue can be employed in this invention. However, an arrangement in which the combustion chamber is provided at the upper portion of the absorbing drum and the lower portion of the combustion chamber is submerged in the absorbing solution can usually be employed in this invention. In the latter case, gas-jet openings are provided at the bottom of the combustion chamber and are thereby sealed by the absorbing solution. The gas-jet openings are desirably submerged in the solution to a depth of about 300 to 800 mm below the liquid level. Further, when the depth is quite large, an increase in the pressure for forcing air into the combustion chamber results causing an increase in the power required. This matter is economically disadvantageous. On the contrary, when the depth is quite small, the contacting time of the combustion gas formed with the absorbing solution is short causing a complete catching of the phosphorus oxide and noble metal particles in the absorbing solution to be difficult. Also, when the liquid level of the absorbing solution varies, the pressure in the combustion chamber varies rendering the combustion unstable. Therefore, the liquid level of the absorbing solution preferably is maintained constant by means of an over-flow method or by providing a liquid level controller, with extra liquid being removed.

Any solution which can absorb the phosphorus oxide gas formed by the combustion can be employed in this invention as the absorbing solution. Generally, water or an alkaline aqueous solution such as sodium carbonate solution, sodium hydroxide solution, potassium carbonate solution, potassium hydroxide solution and calcium hydroxide solution is used. The phosphorus oxide is caught in the solution as phosphoric acid or a phosphate.

On the other hand, since the Group VIII noble metal is dispersed in the absorbing solution as solid particles, the noble metal can be easily recovered by conventional methods such as filtration, centrifugal separation, etc. Moreover, by dispersing a carbonaceous adsorbing agent such as activated carbon, or an organic adsorbing agent such as a cellulosic adsorbing agent in the adsorbing solution, the Group VIII noble metal can be effectively recovered when the solid particles are very fine particles.

Then, to facilitate a more complete understanding of this invention, the process of the present invention is explained by referring to the accompanying drawing, which schematically shows an embodiment of the process of this invention.

In the accompanying drawing, the combustion device includes absorbing drum 1, combustion chamber 3 having burner 2 and contains adsorbing solution 7. The top of the combustion device is connected to condenser 6 through conduit 14 and the bottom of the absorbing drum is connected to pump 4 for discharging the absorbing solution through conduit 10.

The solution containing the organic complex and air are supplied into the burner 2 through conduits 8 and 9, respectively, and burned by means of the burner 2 in combustion chamber 3 sealed by the absorbing solution and the combustion product formed is immediately introduced in the absorbing solution, wherein the Group VIII noble metal and phosphorus oxide formed by the combustion are caught by the absorbing solution. The absorbing solution containing the noble metal and the phosphoric acid or phosphate is withdrawn from the bottom of the absorbing drum by means of pump 4 through conduit 10 and introduced into separator 5, wherein the solution is separated into the Group VIII noble metal and the phosphoric acid solution or phosphate solution. They are recovered through conduit 11 and conduit 12, respectively. A fresh absorbing solution is supplied to the absorbing drum through conduit 13 in order to maintain the level of the absorbing solution constant. A combustion gas component which is not absorbed in the absorbing solution is introduced through conduit 14 into condenser 6, in which the gas component is cooled and is discharged as waste gas after separating mist and condensed water.

As described above in detail, by applying the process of this invention for recovering the Group VIII noble metal from the waste catalyst solution, the Group VIII noble metal can be easily recovered with a high recovery yield as solid particles and at the same time the organophosphorus compound is recovered or discharged as innoxious phosphoric acid or phosphate.

The invention is explained more specifically by reference to the following examples. It is to be understood that the invention is not to be interpreted as being limited to these examples in any way.

EXAMPLE 1

In a submerged combustion device having an inside capacity of 0.5 m$^3$, as shown in the figure, was charged 0.3 m$^3$ of water and a toluene solution containing tris(-triphenylphosphine) rhodium carbonylhydride (RhH(CO)[P(C$_6$H$_5$)$_3$]$_3$) in an amount of 0.3% by weight, as metallic rhodium, triphenylphosphine and triphenylphosphine oxide in an amount of 3% and 2% by weight, respectively, and high boiling by-products resulting in the hydroformylation of propylene in an amount of 21.2% by weight were supplied through conduit 8 at a rate of 5 kg/hr and air through conduit 9 at a rate of 60 Nm$^3$/hr to burner 2 and burned at about 1,180°C. The combustion product was, then, immediately introduced in water to be absorbed. The residence time of the combustion product was 0.5 second. Phosphorus oxide formed in the combustion was absorbed by water to provide phosphoric acid and the rhodium formed was dispersed in the water as solid particles.

While supplying water through conduit 13 so that the volume of water in the absorbing drum was maintained always at 0.3 m$^3$, combustion was conducted continuously for 20 hours and then the combustion products in the combustion device were filtered, whereby 95% of the rhodium was recovered as solid particles and almost 100% of the phosphorus was recovered as phosphoric acid.

EXAMPLE 2

A xylene solution containing rhodium in an amount of 0.3% by weight, triphenylphosphite and oxide of triphenylphosphite in an amount of 3.0% and 2.0% by weight, respectively, and high boiling by-products resulting in the hydroformylation of propylene in an amount of 18.3% by weight was burned as described in Example 1, using an aqueous 2% sodium hydroxide solution as the absorbing solution.

As a result of the combustion, 93% of the rhodium was recovered and 100% of the phosphorus was recovered as sodium phosphate.

EXAMPLE 3

A toluene solution containing 0.5% by weight of a palladium iodidetriphenylphosphine complex, (PdI$_2$[P(C$_6$H$_5$)$_3$]), and 19.8% by weight of triphenylphosphine was treated as described in Example 1.

As a result, 90% of the palladium was recovered and 100% of the phosphorus was recovered.

EXAMPLE 4

A toluene solution containing 0.2% by weight of tris-(triphenylphosphine)iridium carbonylhydride, (IrH(CO)[P(C$_6$H$_5$)$_3$]$_3$), and 2.7% by weight of triphenylphosphine was treated as in Example 1.

As a result, 91% of the iridium and 100% of the phosphorus were recovered, respectively.

While the invention has been described in detail and with reference to specific embodiments thereof, it will be apparent to one skilled in the art that various changes and modifications can be made therein without departing from the spirit and scope thereof.

What is claimed is:

1. A process for recovering a Group VIII noble metal comprising combusting an organic solvent solution containing a soluble complex of the Group VIII noble metal and at least one organophosphorus compound in an oxygen-containing gas, immediately introducing the combustion product into an aqueous absorbing solution to catch in said aqueous solution of Group VIII noble metal particles and the phosphorus oxide formed by the combustion, and recovering the noble metal particles from said aqueous solution.

2. The process as claimed in claim 1, wherein said aqueous absorbing solution is an alkaline aqueous absorbing solution.

3. The process as claimed in claim 1, wherein said aqueous absorbing solution comprises an aqueous absorbing solution with a carbonaceous adsorbing agent suspended therein.

4. The process as claimed in claim 3, wherein said adsorbing agent is activated carbon.

5. The process as claimed in claim 1, wherein the combustion is sealed by the aqueous absorbing solution.

6. The process as claimed in claim 1, wherein said organic solvent solution containing the soluble complex of the Group VIII noble metal is a residue of a reaction mixture obtained in the hydroformylation of an olefin using a soluble complex containing rhodium and a tertiary phosphine as a catalyst from which the aldehyde formed has been removed by distillation.

7. The process as claimed in claim 1, wherein the combusting is at a temperature of about 1,000° to 1,500°C.

8. The process as claimed in claim 1, wherein the amount of oxygen is about 110 to 150% on a molar basis of the theoretical amount.

9. The process as claimed in claim 1, wherein the concentration of the noble metal in the organic solution is about 0.05 to 2% by weight, calculated as the noble metal.

10. The process as claimed in claim 1, wherein the concentration of the phosphorus in the organic solution is about 0.1 to 5% by weight, calculated as phosphorus.

* * * * *